3,654,207
BLOCK-RESISTANT HEAT SEALABLE WAX COMPOSITION

Karekin G. Arabian, Walnut Creek, and Arvid K. Leary, Union City, Calif., assignors to Shell Oil Company, New York, N.Y.
No Drawing. Filed July 22, 1970, Ser. No. 57,365
Int. Cl. C08f 45/52
U.S. Cl. 260—28.5 AV          1 Claim

ABSTRACT OF THE DISCLOSURE

A heat-sealable wax composition having improved resistance to blocking immediately after application contains wax, two ethylene-vinyl acetate copolymers and an ethylene-vinyl acetate-acrylic acid terpolymer.

BACKGROUND OF THE INVENTION

Field of the invention

This invention relates to wax-containing coating compositions and particularly to heat-sealable wax coating compositions containing petroleum wax and certain copolymers and terpolymers containing ethylene and vinyl acetate.

Description of the prior art

Heat-sealable wax compositions used for coating and joining paper and cardboard container stocks are highly specialized materials. Not only must these compositions have high adhesive and cohesive strength, they must also produce a coated stock which has a surface having high gloss, hardness, and scuff-resistance so that packages made from this coated stock maintain attractiveness and sales appeal. In addition, heat-sealable wax compositions must permit easy handling and rapid, inexpensive application. They must be miscible in the liquid phase, have a suitably low viscosity and have good blocking resistance.

There are two types of blocking resistance, both of which are highly desirable. More comonly, blocking resistance refers to the ability of a wax coating to resist becoming tacky and sticky as the temperature of its environment is raised to near the coating's actual melting point. A less common, but equally troublesome, type of blocking often occurs during the first few hours after a heat-sealable wax coating is applied. During this initial period, conventional heat-sealable wax compositions tend to block (stick) even at relatively low temperatures. This initial blocking causes the wax-coated stocks to stick together and their surfaces to become marred. After 5–24 hours, the resistance to blocking improves with conventional materials. The variety of conventional, heat-sealable waxes which are known generally exhibit poor initial block resistance. These materials contain waxes and a variety of modifiers such as polyethylene, isotactic polypropylene, polyisobutylene and ethylene copolymers, such as with vinyl acetate.

It is an object of this invention to provide heat-sealable wax compositions which overcome the problem of poor initial block resistance inherent in the heat-sealable waxes known heretofore.

It is a further object of this invention to provide a heat-sealable wax composition which exhibits a high level of initial block resistance without having a high viscosity, without becoming incompatible in liquid phase and without sacrificing sealing ability, overall gloss, hardness or scuff resistance.

STATEMENT OF THE INVENTION

A heat-sealable wax composition has now been found which offers substantialy improved resistance to initial blocking without degradation or other desirable properties. The heat-sealable wax composition in accordance with the invention contains (a) from 5 to 85% by weight of petroleum wax, (b) from to 10 to 30% by weight of an ethylene-vinyl acetate copolymer having a vinyl acetate content of from 24 to 32% by weight, (c) from 2 to 10% by weight of ethylene-vinyl acetate copolymer having a vinyl acetate content of from 10 to 20% by weight, and (d) from 2 to 5% by weight of an ethylene-vinyl acetate-acrylic acid terpolymer containing from 20 to 32% by weight of vinyl acetate and from 0.1 to 1% by weight of acrylic acid.

DESCRIPTION OF PREFERRED EMBODIMENTS

The composition of the invention essentially comprises petroleum wax in admixture with an ethylene-vinyl acetate-acrylic acid terpolymer, and two ethylene-vinyl acetate copolymers. A vinyl toluene-alpha-styrene copolymer and/or minor amounts of known slip agents and antioxidants may also be present in the composition. acetate copolymers. A vinyl toluene-alpha-methyl styrene The ethylene-vinyl acetate-acrylic acid terpolymer empolyed in these compositions contains from 20–32% by weight (basis terpolymer) of vinyl acetate and from 0.1 to 3% by weight (basis terpolymer) of acrylic acid, copolymerized with ethylene. Preferred terpolymers contain from 24–30% by weight of vinyl acetate, most suitably about 28% by weight of vinyl acetate, have acrylic acid contents of from 0.5% by weight to 1% by weight, that is, have acid numbers of from 4 to 8, most suitably about 6, and contain copolymerized polyethylene as the remainder. Preferred terpolymers are additionally characterized as having low melt indexes, generally from about 3 to 10 and preferably from about 4 to 8.

Two ethylene-vinyl acetate copolymers are used in the wax composition. The first ethylene-vinyl acetate copolymer contains about 24–32% by weight of vinyl acetate and has a melt index of not lower than 300. If a copolymer having a lower melt index, which would be indicative of a higher average molecular weight, is used the viscosity of the fully formulated blend will be too high. Preferred ethylene-vinyl acetate copolymers of the first type contain from 26–30% by weight of vinyl acetate and have a melt index of from about 300 to about 500. Most suitable ethylene-vinyl acetate copolymers of the first type contain about 28% by weight vinyl acetate and have a melt index of from 335 to 465. The second type of ethylene-vinyl acetate copolymer contains from 10–20% by weight of vinyl acetate and has a low melt index. The melt index of the second ethylene-vinyl acetate copolymer is suitably from 1.5 to about 5. Ethylene-vinyl acetate copolymers either having a higher melt index, and hence a lower molecular weight, or having a higher vinyl acetate content are not satisfactory as the second copolymer component, giving undesirably poor initial blocking resistance. Preferred second type copolymers contain from 15–20% by weight of vinyl acetate. Most suitable second type copolymers contain about 18% by weight of vinyl acetate with the remainder being ethylene and have melt indexes of about 2.5.

The waxes which may be used in accordance with the invention are petroleum waxes derived from the refining of waxy lubricating oil base stocks. These waxes include both the distillate waxes and the residual waxes. By "distillate waxes" as used herein is meant those waxes which are derived from the refining of distillate lubricating oil. The term "residual waxes" refers to those waxes which are removed during the refining of the residual lubricating oils such as bright stock. The distillate waxes are generally paraffinic in nature. The residual waxes contain a mixture of both microcrystalline (amorphous) wax, and high melting paraffinic wax. However, such waxes can be further refined to produce separate wax fractions which are essentially microcrystalline wax, and essentially high melting point paraffinic wax. Preferred waxes are rather highly refined, i.e., they should contain no more than about 2% by weight of oil, and generally have a melting point of from about 150° F. to about 165° F. An especially preferred petroleum wax is a blend of two fully refined paraffin waxes and one residual wax, and consists of (a) a distillate paraffinic wax (Wax A) having a melting point, as measured by the ASTM D–87 test, of about 135° F.–150° F. which contains no more than about 30% by weight of non-normal paraffins, (b) a residual petroleum wax (Wax B) having an ASTM D–127 melting point above 160° F., preferably from 165° F.–185° F., and (c) a distillate paraffinic wax (Wax C) having an ASTM D–87 melting point above 150° F. which contains at least 40% by weight of non-normal paraffins.

This especially preferred wax blend contains from about 25 to 50% by weight of Wax A, 5 to 25% by weight of Wax B, and 25 to 50% by weight of Wax C, and most suitably contains from 35 to 45% by weight of Wax A, 10 to 20% by weight of Wax B and 35 to 45% by weight of Wax C. Other petroleum waxes which are suitable, but less preferred, include petroleum waxes having a melting point from 130° F. to 185° F.

The ratio of the terpolymer and the two copolymers to the wax employed in the compositions of the invention is critical. It is essential that the composition contain not less than 2% by weight nor more than 5% by weight of the terpolymer (based on total composition). If less than 2% of terpolymer is employed, the strength of the heat seal will be too low. If more than 5% of terpolymer is used, the composition will separate into several liquid phases.

Illustrative heat sealable compositions contain the following proportions of materials by weight:

| | Percent |
|---|---|
| Terpolymer | 2–5 |
| First copolymer (ethylene with 24–32% vinyl acetate) | 10–30 |
| Second copolymer (ethyelne with 10–20% vinyl acetate) | 2–10 |
| Petroleum wax | 55–85 |

Preferred compositions contain the following proportions:

| | Percent |
|---|---|
| Terpolymer | 2–5 |
| First copolymer | 15–25 |
| Second copolymer | 3–8 |
| Petroleum wax | 62–80 |

Optionally, other materials may be added to these wax compositions to enhance certain properties. For example, addition of up to about 5% by weight, basis total composition, of vinyl toluene-alpha-methyl styrene copolymer, especially that copolymer having a melting point of from 190° F. to 230° F., and most suitably about 212° F., is useful to improve seal strength. Addition of more than 5% by weight of this additive adversely affects the resistance to early blocking. It is preferred to add from 2 to 5% by weight of this additive. Minor amounts, e.g., up to about 5% by weight total, of antioxidants, slip agents, scuff and gloss improvers may also be added if desired. The composition of the invention may be blended using well-known conventional techniques. It is not intended that the invention be limited in any way by the method of blending the components.

The following examples are illustrative of the process of the invention. It is to be understood that these examples are given only for illustration and are not to be construed as limiting the invention in any way.

EXAMPLE I (A) A heat-sealable wax coating composition (Composition A) in accordance with the invention was prepared. It contained 73% wt. petroleum wax, 17% wt. of an ethylene-vinyl acetate copolymer having a melt index of 335 to 465 and a vinyl acetate content of 28%, 5% wt. of an ethylene-vinyl acetate copolymer having a melt index of 2 to 3 and a vinyl acetate content of 18%, 2% by weight of a terpolymer of ethylene-vinyl acetate and acrylic acid containing 28% by weight of vinyl acetate and having an acid number of 6, 3% by weight of a vinyl toluene-alpha-methyl styrene copolymer having a melting point of 212° F., and 0.15% by weight of a conventional ethylene bis- (N,N-oleamide) slip agent. The petroleum wax employed was a 30:10:30 weight ratio of (a) a fully refined paraffin wax having an ASTM D–87 melting point of 141° F., (b) a fully refined paraffin wax having a D–87 melting point of 160° F. and (c) a residual petroleum wax containing both microcrystalline and high melting point paraffinic wax and having an ASTMD D–127 melting point of 177° F.

(B) The wax composition of the invention (Composition A) was compared to a conventional heat-sealable composition (Composition B) containing 71% by weight of the petroleum wax used in part A, 5% by weight of an ethylene vinyl acetate copolymer (melt index 125–175 and containing 18% vinyl acetate) 14% by weight of a 125–175 melt index ethylene-vinyl acetate copolymer containing 28% by weight vinyl acetate, 6% by weight of vinyl toluene-alpha-methyl styrene copolymer, 4% polyethylene having a molecular weight of 10,000 and 0.10% of slip agent. Both blends were fully compatible in the liquid phase, both were low viscosity (viscosity at 300° F., A–260 cps., B–240 cps.) both gave excellent seals to carton stock at 73° F. initially and after seven days and also at −50° F.

| | A | B |
|---|---|---|
| Initial seal at 73° F., g./in | 600–700 | 600–700 |
| After 7 days, at 73° F., g./in | 500–600 | 500–600 |
| After 2 hours at −50° F., g./in | 600–700 | 600–700 |

Both had excellent resistance to blocking after 24 hours, both not blocking until 125–129° F. after 24 hours. However, blend A gave excellent resistance to blocking immediately after cooling, having an initial blocking temperature of 127–129° F. Blend B was far inferior, giving initial blocking at 109–111° F.

EXAMPLE II

A series of wax compositions were prepared varying the materials and the proportions used in Composition A of Example I. Table I lists the compositions and their performance.

| Composition | Change from Composition A | Performance |
|---|---|---|
| C | No ethylene-vinyl acetate-acrylic acid terpolymer. | Poor seal at −50° F. and 73° F. after 7 days. |
| D | Substitute 6% vinyl toluene-alpha-methyl styrene copolymer for the acid terpolymer. | Low initial block. |
| E | No ethylene-vinyl acetate copolymer with 18% vinyl acetate and a melt index of 2.5. | Do. |
| F | Use only paraffin wax for the wax component. | Poor seal at −50° F. and 73° F. after 7 days. |
| G | Substitute 10,000 mol. wt. polyethylene for the ethylene-vinyl acetate copolymer with 18% vinyl acetate and a melt index of 2.5. | Poor seal at −50° F. and at 73° F. |
| H | Substitute a terpolymer with an acid number of 10 instead of an acid number of 6. | Blend becomes incompatible when melted and forms two liquid layers. |

We claim as our invention:
1. A heat-sealable petroleum wax coating composition consisting essentially of from 15 to 25% by weight of an ethylene-vinyl acetat copolymer having a vinyl acetate content of about 28% by weight and a melt index of from

300 to about 500; from 3 to 8% by weight of an ethylene-vinyl acetate copolymer having a vinyl acetate content of about 18% by weight and a melt index of about 2.5; from 2 to 5% by weight of an ethylene-vinyl acetate-acrylic acid terpolymer containing about 28% by weight vinyl acetate and from 0.5 to 1% by weight of acrylic acid and having a melt index of from 3 to 10; from 2 to 5% by weight of a vinyl toluene-alpha-methyl styrene copolymer having a melting point of from 190–230° F. and from 57 to 78% by weight of petroleum wax which comprises from 25 to 50% by weight (basis petroleum wax) of a distillate paraffinic wax having an ASTM D-87 melting point of from 135 to 150° F., from 5 to 25% by weight of a high melting point residual wax, containing both microcrystalline and high melting point paraffinic wax and having an ASTM D-127 melting point of at least 160° F. and from 25 to 50% by weight of a distillate paraffinic wax having an ASTM D-87 melting point of 150° F. to 165° F.

References Cited
UNITED STATES PATENTS

| | | | |
|---|---|---|---|
| 3,215,657 | 11/1965 | Beresniewicz | 260—28.5 AV |
| 3,541,035 | 11/1970 | Baum | 260—28.5 AV |
| 3,362,839 | 1/1968 | Weindl | 260—28.5 AV |
| 3,297,610 | 1/1967 | Moyer | 260—28.5 AV |
| 3,355,405 | 11/1967 | Tyran | 260—28.5 AV |

MORRIS LIEBMAN, Primary Examiner

P. R. MICHL, Assistant Examiner

U.S. Cl. X.R.

260—897 B